US007776113B2

(12) United States Patent
Wang et al.

(10) Patent No.: US 7,776,113 B2
(45) Date of Patent: Aug. 17, 2010

(54) CATALYSTS, REACTORS AND METHODS OF PRODUCING HYDROGEN VIA THE WATER-GAS SHIFT REACTION

(75) Inventors: Yong Wang, Richland, WA (US); Anna Lee Y. Tonkovich, Dublin, OH (US)

(73) Assignee: Battelle Memorial Institute, Richland, WA (US)

( * ) Notice: Subject to any disclaimer, the term of this patent is extended or adjusted under 35 U.S.C. 154(b) by 35 days.

(21) Appl. No.: 12/347,966

(22) Filed: Dec. 31, 2008

(65) Prior Publication Data

US 2009/0169443 A1  Jul. 2, 2009

Related U.S. Application Data

(62) Division of application No. 10/669,263, filed on Sep. 25, 2003, now Pat. No. 7,488,360.

(51) Int. Cl.
*B01J 8/00* (2006.01)

(52) U.S. Cl. ............... 48/127.9; 48/61; 48/84; 48/198.3; 48/198.7; 422/187; 422/188; 422/189; 422/190; 422/198; 422/211; 502/300; 502/330; 502/308; 502/326; 502/102; 502/439

(58) Field of Classification Search ........................ None
See application file for complete search history.

(56) References Cited

U.S. PATENT DOCUMENTS

| | | | |
|---|---|---|---|
| 4,472,533 A | 9/1984 | Moskovits | 502/320 |
| 4,975,406 A | 12/1990 | Frestad et al. | 502/332 |
| 5,030,440 A | 7/1991 | Lywood et al. | |
| 5,075,277 A | 12/1991 | Saiai et al. | 502/333 |
| 5,366,719 A | 11/1994 | van Wingerden et al. | |
| 5,422,331 A | 6/1995 | Galligan et al. | 502/333 |
| 5,482,680 A | 1/1996 | Wilkinson et al. | 422/177 |
| 5,674,301 A | 10/1997 | Sakai et al. | |
| 5,866,734 A | 2/1999 | Flick et al. | |
| 6,025,297 A | 2/2000 | Ogura et al. | |
| 6,040,266 A | 3/2000 | Fay, III et al. | 502/439 |
| 6,162,267 A | 12/2000 | Priegnitz | 48/199 |

(Continued)

FOREIGN PATENT DOCUMENTS

EP    0406896 A1    1/1991

(Continued)

OTHER PUBLICATIONS

International Search Report from PCT/US 02/04528 (Oct. 2002).

(Continued)

*Primary Examiner*—Alexa D. Neckel
*Assistant Examiner*—Kaity V. Handal
(74) *Attorney, Agent, or Firm*—Frank Rosenberg; Derek H. Maughan (57) ABSTRACT

The reaction of carbon monoxide with steam over an alkali-modified ruthenium-on-zirconia catalyst has been found to yield surprisingly high yields of hydrogen gas at relatively low temperatures. Catalyst structures, reactors, hydrogen production systems, and methods for producing hydrogen utilizing the alkali-modified ruthenium-on-zirconia catalyst are described. Methods of making catalysts are also described.

11 Claims, 5 Drawing Sheets

U.S. PATENT DOCUMENTS

| | | | |
|---|---|---|---|
| 6,436,363 B1 | 8/2002 | Hwang et al. | 423/651 |
| 6,440,895 B1 | 8/2002 | Tonkovich et al. | |
| 6,497,856 B1 | 12/2002 | Lomax, Jr. et al. | |
| 6,524,550 B1 | 2/2003 | Chintawar | 423/650 |
| 6,562,315 B2 | 5/2003 | Korotkikh et al. | |
| 6,652,830 B2 | 11/2003 | Wang et al. | |
| 6,969,505 B2 | 11/2005 | Tonkovich et al. | |
| 2005/0072048 A1 | 4/2005 | Lesieur | |

FOREIGN PATENT DOCUMENTS

| | | | |
|---|---|---|---|
| EP | 480461 | * | 4/1992 |
| EP | 0529329 A2 | | 3/1993 |
| EP | 1232790 | | 8/2002 |
| WO | WO 99/00186 | | 1/1999 |
| WO | WO 9915715 A2 | * | 4/1999 |
| WO | WO 00/06295 | | 2/2000 |
| WO | WO 00/06301 | | 2/2000 |
| WO | WO 01/12312 | | 2/2001 |

OTHER PUBLICATIONS

Lee et al., "Effect of Basic Additives on Pt/Al2O3 for CO and Propylene Oxidation under Oxygen-Deficient Conditions," Ind. Eng. Chem. Res., vol. 36 (1997).

Leonov et al., "Monolithic Catalyst Supports With Foam Structure," React. Kinet. Catal. Lett., vol. 60, pp. 259-267 (1997).

Twigg et al., Metal and Coated-Metal Catalysts, Chapter 3, pp. 59-89.

Venkataraman et al., "Steam Reforming of Methane and Water-Gas Shift in Catalytic Wall Reactors," AIChE Journal, vol. 49, 1277-1284 (May 2003).

Taiwanese Patent Publication No. 374825, "A pre-combustion Catalytic Converter and a Process for Producing Such a Converter," English Translation (1988).

Tonkovich et al., Microchannel Reactors for fuel processing applications. I. Water gas shift reactor, Chem. Eng. Sci. 54, 2947-2951 (1999).

Tonkovich et al., "Microchannel Chemical Reactors for fuel processing," Process Mini: 2nd Int'l Conf. On Micro. Tech., 186-195 (1998).

* cited by examiner

CATALYSTS, REACTORS AND METHODS OF PRODUCING HYDROGEN VIA THE WATER-GAS SHIFT REACTION

This application is a divisional of U.S. patent application Ser. No. 10/669,263 filed Sep. 25, 2003, now U.S. Pat. No. 7,488,360, which was a divisional of U.S. patent application Ser. No. 09/788,330 filed Feb. 16, 2001, now U.S. Patent No. 6,652,830, both of which applications are incorporated herein by reference as if reproduced in full below.

FIELD OF THE INVENTION

The invention relates to catalysts, reactors and methods of producing hydrogen from the water gas shift reaction.

INTRODUCTION

Hydrogen gas ($H_2$) can be readily produced from synthesis gas (syngas) by steam reforming, or partial oxidation, or autothermal reforming of hydrocarbons. Additional $H_2$ is then produced by allowing syngas to react with steam according to the following exothermic water gas shift reaction (WGSR):

$$CO + H_2O = H_2 + CO_2$$

The thermodynamics of WGSR are well known. The equilibrium constant of this reaction increases as temperature decreases. Hence, to increase the production of $H_2$, it is desirable to conduct the reaction at lower temperatures, which are also preferred from the standpoint of steam economy.

Two types of commercially available WGSR catalysts are: iron-based high temperature (HT) shift and copper-based low temperature (LT) shift catalysts with Cu based catalysts being relatively more active. However, both catalysts are not very active under their applicable conditions as indicated by their operational contact times (contact time is defined as catalyst bed volume divided by volumetric gas feed flowrate at standard temperature and pressure) of several seconds. Longer contact times imply the requirement of large catalyst bed volume. Operating at shorter contact times with these commercial catalysts requires higher reaction temperatures, which not only accelerates catalyst deactivation due to metal sintering but also disfavors the thermodynamics of the WGSR, as mentioned above.

SUMMARY OF THE INVENTION

It has been discovered that the use of a zirconia-supported, alkali-metal-modified, ruthenium catalyst in the water gas shift reaction produces unexpectedly superior results.

In one aspect, the invention provides a catalyst comprising: a porous substrate having an average pore size of from 1 μm to 1000 μm, and, disposed over the porous substrate, a zirconia-supported, alkali-metal-modified, ruthenium catalyst.

The catalyst can be made by wash-coating zirconia-supported alkali-metal-modified ruthenium catalyst on a porous substrate. Zirconia supported alkali-metal modified ruthenium catalyst can be prepared, for example, using the incipient wetness method.

In a related aspect, the invention provides a new method of producing hydrogen gas. In this method, a reactant gas mixture comprising carbon monoxide and water vapor is contacted with the zirconia-supported, alkali-metal-modified, ruthenium catalyst.

The invention also provides a reactor containing the inventive catalyst. Typically, the reactor contains a reactor inlet, a reaction chamber, and a reactor outlet. It is particularly advantageous for the reactor to also contain a microchannel heat exchanger in thermal contact with the reaction chamber. The microchannel heat exchanger enables rapid heat transfer from the reaction chamber thus allowing the inventive catalyst to operate at near isothermal and low temperature conditions to maximize CO2 selectivity while maintaining high conversions of carbon monoxide.

Another related aspect of the present invention is the use of the catalyst in a hydrogen production system. For example, the invention includes a fuel system containing the above-described reactor. In another aspect, the invention provides a hydrogen production system having a fuel source (preferably a liquid fuel tank); a primary conversion reactor (where a process such as steam reforming, partial oxidation, or autothermal reforming is conducted) to produce a gas mixture containing hydrogen, carbon dioxide, and carbon monoxide; and a water gas shift reactor. The water gas shift reactor includes a shift reactor inlet, a reaction chamber, and a shift reactor outlet. The shift reactor inlet is connected to the primary conversion reactor exhaust outlet such that carbon-monoxide-containing exhaust from the primary conversion reactor is fed into the shift reactor. The reaction chamber contains a zirconia-supported, alkali-metal-modified, ruthenium catalyst.

Various embodiments of the invention can provide numerous advantages including one or more of the following: high carbon monoxide conversions, high carbon dioxide selectivity, low methane selectivity, operation at short contact times, and low temperature operation.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE INVENTION

The reaction of carbon monoxide (CO) and water vapor ($H_2O$) over ruthenium on zirconia ($Ru/ZrO_2$) at short contact times (<1 s) was found to produce hydrogen ($H_2$) in good yields when hydrogen is not present in the reactant mixture. However, attempts to produce hydrogen from carbon monoxide and water at low contact times over a ruthenium on zirconia (Ru/ZrO$_2$) catalyst in the presence of hydrogen gas were found unsatisfactory because at high CO conversions, very little carbon dioxide was produced. Instead, methane formed in the undesired methanation side reaction:

$$CO+6H_2=CH_4+H_2O$$

Figure 1:
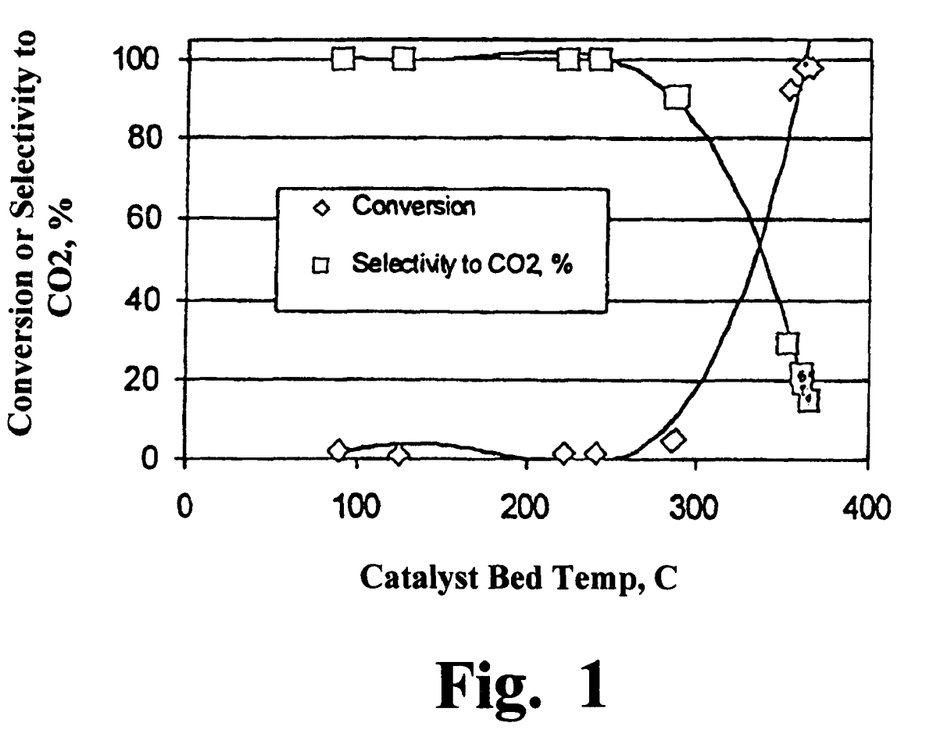
FIG. 1 is a plot of CO conversion (♦) and $CO_2$ selectivity (■) vs. temperature for the reaction of a gas mixture consisting of 8% CO, 7% $CO_2$, 38% $H_2$, and 47% $H_2O$, over a powder $Ru/ZrO_2$ catalyst, at a 25 millisecond (ms) contact time.

An example of results from reaction of a gas mixture consisting of 8% CO, 7% CO$_2$, 38% H$_2$, and 47% H$_2$O, (unless specified otherwise, gas mixtures are reported in volumetric percents) over a powder 5 wt % Ru/ZrO$_2$ catalyst, at a 25 millisecond (ms) contact time, is illustrated in FIG. 1. As can be seen in the figure, at 350° C., the conversion of CO is about 90% but the selectivity to carbon dioxide is less than 30%. Thus, there was a formidable challenge to develop a highly selective, yet active catalyst for the water gas shift reaction.

Figure 2:
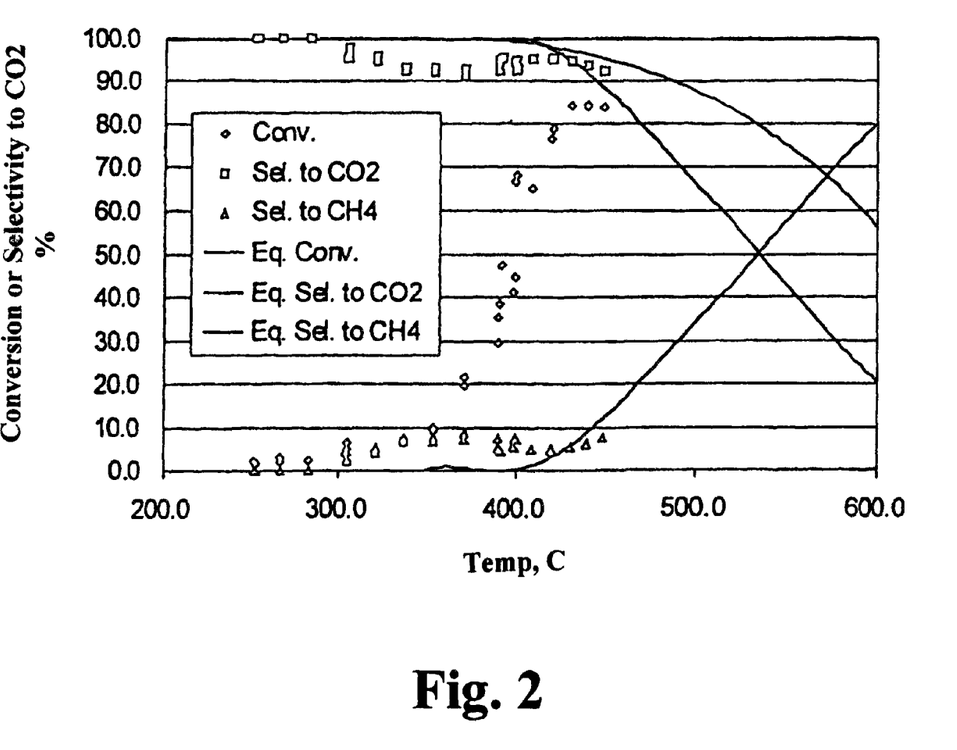
FIG. 2 is a plot of CO conversion (♦), $CH_4$ selectvity (▲), and $CO_2$ selectivity (■) vs. temperature for the reaction of a gas mixture consisting of 8% CO, 7% $CO_2$, 38% $H_2$, and 47% $H_2O$, over a powder 0.5 wt % Ru-1.5 wt % $K/ZrO_2$ catalyst, at a 25 ms contact time.

It was surprisingly discovered that greatly improved results could be obtained by use of a zirconia-supported, potassium-modified, ruthenium catalyst. An example of results from reaction of a gas mixture consisting of 8% CO, 7% CO$_2$, 38% H$_2$, and 47% H$_2$O, over a powder 0.5 wt % Ru-1.5 wt % K/ZrO$_2$ catalyst, at a 25 ms contact time, is illustrated in FIG. 2. As can be seen in the figure, at a catalyst bed temperature of about 420° C., the conversion of CO reaches about 85% while the selectivity to carbon dioxide is greater than 90%.

Figure 3:
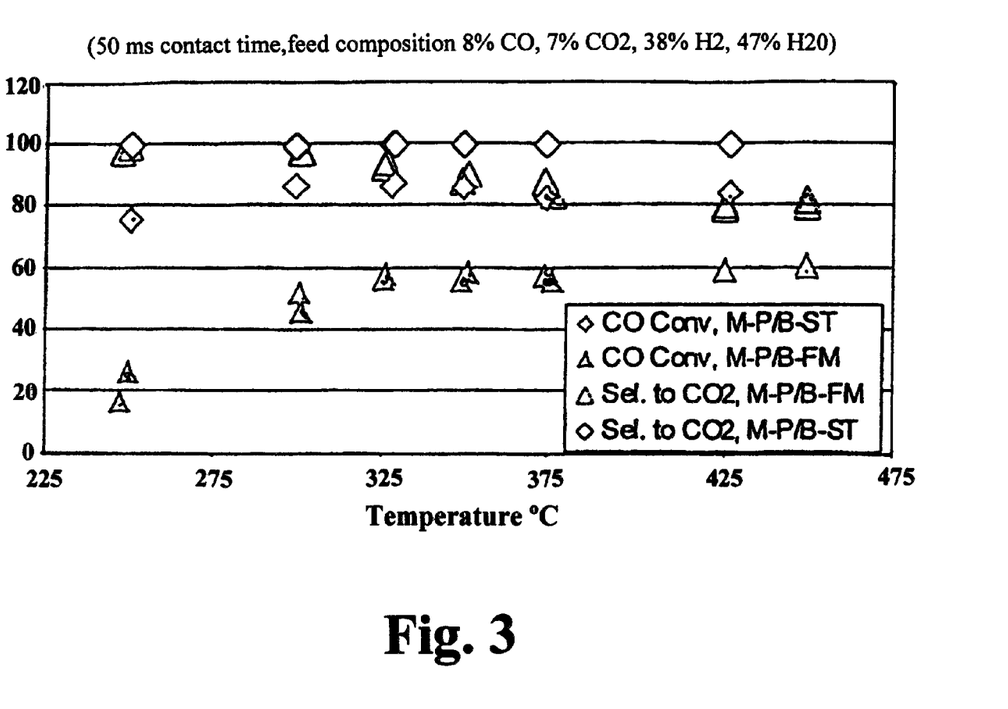
FIG. 3 is a plot of CO conversion (♦, ▲) and $CO_2$ selectivity (◇, △) vs. temperature for the reaction of a gas mixture consisting of 8% CO, 7% $CO_2$, 38% $H_2$, and 47% $H_2O$, over a 0.5 wt % Ru-1.5 wt % $K/ZrO_2$/(felt (♦, ◇) or foam (▲, △)) catalyst, at a 50 ms contact time.

It was subsequently discovered that distributing the zirconia-supported, potassium-modified, ruthenium over a large pore substrate can yield even better results. For example, FIG. 3 shows CO conversion and selectivity to CO$_2$ on a 0.5 wt % Ru-1.5 wt % K/ZrO$_2$/felt catalyst in which the 0.5 wt % Ru-1.5 wt % K/ZrO$_2$ powder has been deposited on a FeCrAlY felt having a thickness of 0.01 inch (0.25 mm) inserted into a single channel having a width of 0.03 inch (0.76 mm). At a contact time of 50 ms and a temperature of about 300° C. the felt catalyst gives higher than 85% CO conversion with near 100% CO$_2$ selectivity. The felt form (having a substrate made of randomly interwoven FeCrAlY strands) was found to perform better than the foam form (having a substrate made of a stainless steel foam).

Catalysts of the present invention include ruthenium metal, an alkali modifier and a zirconium oxide (zirconia), preferably ZrO$_2$ although variation from this stoichiometry is acceptable, especially in light of the alkali modifier. Thus far, only potassium (K) has been tested as the alkali modifier; however, it is believed that the primary effect of the alkali modifier is to reduce the hydrogen chemisorption, and therefore it is believed that other alkali metals, would also be effective modifiers.

The catalyst preferably contains 0.1 wt % to 10 wt %, more preferably 0.2% to 3% weight percent Ru. The Ru should be dispersed over the ZrO$_2$ surface. Too little Ru can result in too few catalytic sites, while too much Ru is costly due to lower Ru dispersion. The alkali metal, preferably K, is preferably present in a range of 0.1 to 10, more preferably 0.5 to 3 weight percent. Too little alkali metal can result in undesirably low CO$_2$ selectivity while too much alkali metal could reduce CO conversion to undesirably low levels. In embodiments in which the zirconia-supported, alkali-metal-modified, ruthenium catalyst is disposed over a large pore support, the foregoing weight ranges do not include the weight of the underlying large pore support.

High surface area ZrO$_2$ (BET surface area>10 m$^2$/g) is a preferred catalyst support. While many substitute materials have not yet been tested for use in the inventive catalyst, it is anticipated that many equivalent substitute materials could be identified in the course of routine experimentation. In some embodiments, other metal oxides could be used instead of, or in addition to, zirconia. Preliminary testing has indicated that substitution of these oxides in place of zirconia also results in hydrogen production but at lower conversions.

The catalyst may take any conventional form such as a powder or pellet. In some preferred configurations, the catalyst includes an underlying large pore support. Examples of preferred large pore supports include commercially available metal foams and, more preferably, metal felts. Prior to depositing the zirconia-supported, alkali-metal-modified, ruthenium catalyst, the large pore support has a porosity of at least 5%, more preferably 30 to 99%, and still more preferably 70 to 98%. Preferably, the support has an average pore size (sum of pore diameters/number of pores) of from 1 μm to 1000 μm as measured by optical and scanning electron microscopy. Preferred forms of porous supports are foams and felts. Foams are continuous structures with continuous walls defining pores throughout the structure. Felts are fibers with interstitial spaces between fibers and includes tangled strands like steel wool. Various supports and support configurations are described in U.S. patent application Ser. No. 09/640,903 (filed Aug. 16, 2000), U.S. Pat. No. 6,680,044, which is incorporated by reference. U.S. patent application Ser. No. 09/375,614 (filed Aug. 17, 1999) is also incorporated herein.

The catalyst with a large pore support (and including the zirconia-supported, alkali-metal-modified, ruthenium catalyst) preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

Certain aspects of the catalyst may be best characterized with reference to measurable properties of the water gas shift reaction. In some preferred embodiments, when the catalyst is tested by placement in a reaction chamber and contacted with a reactant gas mixture containing 8% CO, 7% CO$_2$, 38% H$_2$, and 47% H$_2$O, at a contact time of 25 ms and a temperature of 420° C., it results in greater than 70% (and in some preferred embodiments 70 to 85%) CO conversion and at least 80% (and in some preferred embodiments 80 to 95%) CO$_2$ selectivity. In preferred embodiments where the catalyst contains a large pore support, preferred embodiments of the catalyst can be characterized such that when the catalyst is tested by placement in a reaction chamber and contacted with a reactant gas mixture containing 8% CO, 7% CO$_2$, 38% H$_2$, and 47% H$_2$O, at a contact time of 50 ms and a temperature of 325° C., it results in greater than 70% (and in some preferred embodiments 70 to 85%) CO conversion and at least 80% (and in some preferred embodiments 85 to 100%) CO$_2$ selectivity.

One preferred method of making the catalyst is by impregnating zirconia with solutions of Ru and K followed by drying, calcining, and reducing. Other methods could be used. For example, it is also anticipated that catalyst with the aforementioned preferred compositions can be prepared by a co-precipitation method using inorganic or organometallic Zr precursors, Ru and K precursors.

In the inventive method of producing hydrogen gas, a reactant gas mixture comprising carbon monoxide and water vapor is contacted with the zirconia-supported, alkali-metal-modified, ruthenium catalyst. In typical applications, such as in an portable fuel processing system, the gas mixture will also contain carbon dioxide, hydrogen, and/or inert gases such as nitrogen. In certain preferred embodiments, the gas mixture comprises, in mole % (which is equivalent to partial pressures) 1 to 15% CO, 1 up to 70% $H_2O$, 1 to 15% $CO_2$, and up to 75% $H_2$, more preferably, 3 to 20% CO, 3 to 60% $H_2O$, 3 to 20% $CO_2$, and 10 to 60% $H_2$. It is desired to conduct the water gas shift reaction under conditions that minimize the methanation reaction. The water-gas-shift catalyst is typically contained in a reaction chamber. The temperature at the catalyst during the reaction is preferably less than 450° C., more preferably in the range of 200 to 420° C., and still more preferably in the range of 250 to 350° C. to maximize equilibrium CO conversion. Temperature favors reaction rate, but disfavors equilibrium CO conversion. Shorter contact times (defined as the total volume of catalyst-containing reaction chambers divided by the total volume of reactant gases corrected to 273K and 1 atm, and assuming ideal gas behavior) are preferred to minimize reactor volume, preferably less than 1 s, more preferably in the range of 3 to 100 ms. Conversion of carbon monoxide (defined as CO mole change between reactant and product divided by moles CO in reactant), typically measured in conjunction with the above-described ranges, is preferably at least 70%; and in some preferred embodiments conversion is in the range of 50 to 85%. Selectivity to carbon dioxide (defined as moles $CO_2$ produced divided by moles $CO_2$ produced plus moles $CH_4$ produced), typically measured in conjunction with the above-described ranges and CO conversions, is preferably at least 70%; and in some preferred embodiments $CO_2$ selectivity is in the range of 80 to 100%.

Figure 4:
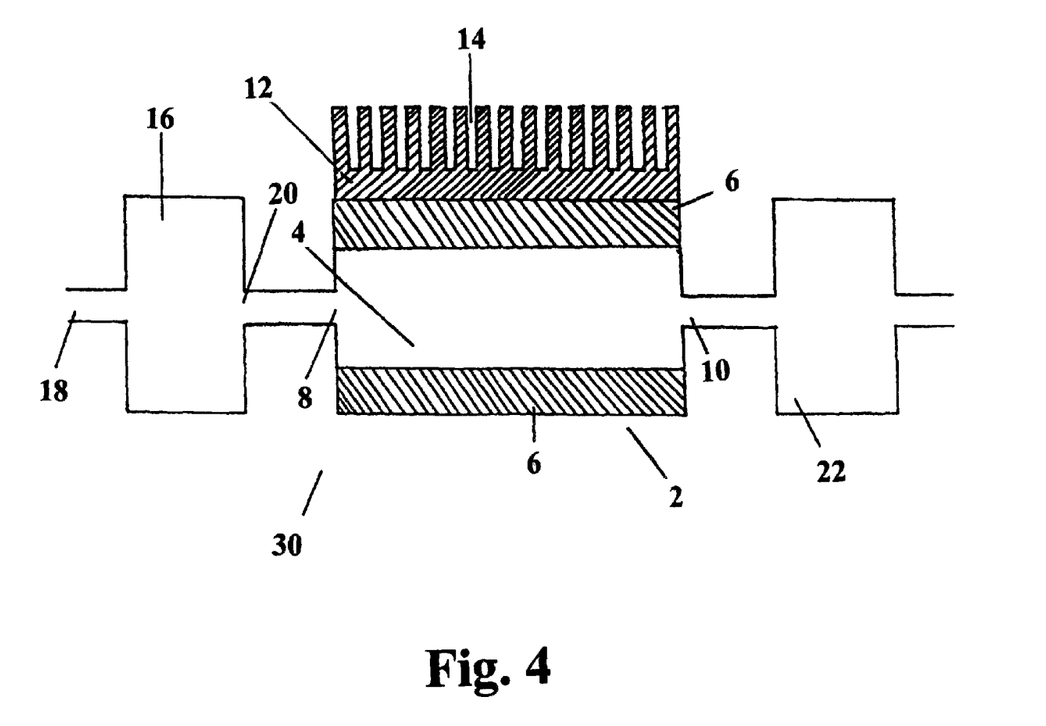
FIG. 4 is a schematic of a simplified fuel cell system that includes a cross-sectional view of a water gas shift reactor that includes a microchannel heat exchanger.

One embodiment of a reactor 2 is shown in cross-section in FIG. 4. The reaction chamber 4 contains catalyst 6 and has an inlet 8 and outlet 10. In FIG. 4, the catalyst is shown on the top and bottom of the reaction chamber with an open channel from the reactor inlet to the outlet—this configuration is called "flow-by." Other configurations, such as "flow-through" where flow is directed through a porous catalyst, are, of course, possible. To improve heat transfer, a microchannel heat exchanger 12 can be placed in contact with the reaction chamber. The microchannel heat exchanger 12 has channels 14 for passage of a heat exchange fluid. These channels 14 have at least one dimension that is less than 1 mm. The distance from the channels 14 to catalyst 6 is preferably minimized in order to reduce the heat transport distance. Microchannel heat exchangers can be made by known techniques such as electrodischarge machining (EDM).

Figure 5:
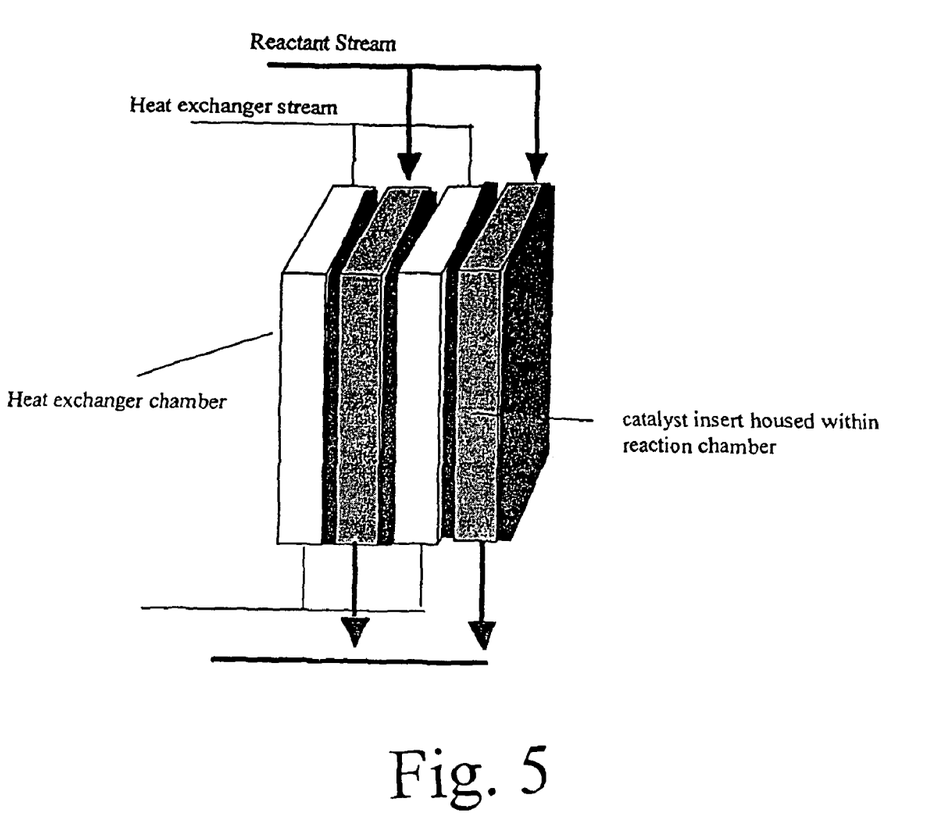
FIG. 5 is a schematic view of an interleaved microchannel reactor oriented in a co-current flow configuration.

The preferred reaction chamber for the water gas shift reaction may be of any length or height. The preferred reaction chamber width is less than 2 mm. More preferably the reaction chamber width is less than 1 mm. The reaction chamber is preferably in thermal contact with a heat exchange chamber to remove the exothermic reaction heat from the WGSR. The heat exchange chamber in thermal contact with the reaction chamber may also be of any length or height. Preferably the length and height of the heat exchange chamber is close to the dimensions of the reaction chamber. Most preferably the heat exchange chamber is adjacent to the reaction chamber in an interleaved chamber orientation (see FIG. 5—width is the direction in which the interleaved reaction chambers and heat exchange chambers stack). The width of the heat exchanger chamber is preferably less than 2 mm. More preferably the width of the heat exchange chamber is less than 1 mm. The direction of flow in the heat exchange chamber may be either co-current, counter-current, or cross-flow. This approach will enable excellent heat transfer performance.

The WGS reactor may also be configured by placing the reaction chamber adjacent to a heat exchanger chamber that is comprised of an array of microchannels rather than a single microchannel. In this configuration the width of the reaction chamber may exceed 2 mm, but at least one dimension of a single microchannel in the array must be less than 2 mm. Preferably this dimension is less than 1 mm. The allowable width of the reaction chamber is a strong function of the effective thermal conductivity of the catalyst insert. The higher the effective thermal conductivity, the wider the insert to enable rapid heat removal. For effective thermal conductivites on the order of 2 W/m/, it is anticipated that the maximum reaction chamber width must remain less than 2 mm and preferably 1 mm. The advantage of this design approach is easier manifolding, fluid connections, and catalyst loading; but this approach may result in a reduction in heat transfer performance. In some system configurations and embodiments the simpler manifolding may result in a lower system cost that offsets the reduction in heat transfer performance.

In preferred embodiments, the reaction chamber 4 is connected to the outlet of a primary conversion reactor 16 such that exhaust from the primary conversion reactor flows into the reaction chamber. Thus, in a typical configuration, fuel and an oxidizer flow through inlet 18 into the primary conversion reactor 16 where the fuel is converted to CO, $H_2O$ and $CO_2$. The primary conversion gases flow out through exhaust port (outlet) 20 and into the reaction chamber where CO and $H_2O$ are converted to $H_2$ and $CO_2$. The product gases (including $H_2$) then may either flow into fuel cell 22 where the $H_2$ is combined with $O_2$ to generate electricity, or the product of the WGSR flows into a secondary clean up process to remove residual levels of carbon monoxide. The secondary clean-up process may include a preferential oxidation reactor, membrane separation of either hydrogen or carbon monoxide, a sorption based separation system for either hydrogen or carbon monoxide, and the like. These elements form a highly simplified fuel processing system 30. In practice, fuel processing systems will be significantly more complex. Typically, heat from the combustor will be used to generate heat for other processes such as generating steam (not shown) that can be utilized for a steam reformer, autothermal reactor and water gas shift reactor. Water-gas shift reactors can operate in series. Usually, hydrogen gas from the shift reactor(s) will be purified before it flows into the fuel cell. Various fuel cells are well-known and commercially available and need not be described here. Instead of fuel cell 22, the hydrogen-containing gas could go to: a storage tank, a refueling station, a hydrocracker, hydrotreater, or to additional hydrogen purifiers.

EXAMPLES

The following examples are descriptions based on typical conditions used to make numerous samples. Certain temperatures, etc. set forth preferred values for conducting various steps.

Example 1

5 wt % $Ru/ZrO_2$ catalyst was prepared by conventional incipient wetness impregnation. ZrO2 (6568-45-11F3 ⅛"

extrudates) was obtained from Engelhard, and ground and sieved into 70-100 mesh. Ru was impregnated onto the $ZrO_2$ support to its incipient wetness point (0.4 cc/g) from an aqueous solution of $RuCl_3$ hydrate (Aldrich, 99.98%). The impregnated sample was set at room temperature for 30 min prior to drying under vacuum at 100° C. overnight. Finally, the catalyst was calcined under ambient conditions with a ramping rate of 5 C/min to 350° C. and isothermally held at that temperature for 1 h.

The water gas shift reaction was carried out in a conventional fixed-bed down flow reactor. The reactor used for powder testing has an inside diameter of 5 mm. Typical catalyst loading was 0.06 gram of 70-100 mesh particles. FIG. 1 shows an example of results from reaction of a gas mixture consisting of 8% CO, 7% $CO_2$, 38% $H_2$, and 47% $H_2O$, over this powder 5 wt % $Ru/ZrO_2$ catalyst, at a 25 millisecond (ms) contact time. As can be seen in the figure, at 350° C., the conversion of CO is about 90% but the selectivity to carbon dioxide is less than 30%. Thus, Ru on $ZrO_2$ is not a selective water gas shift catalyst when hydrogen is present in the reactant mixture.

Example 2

An improved powder catalyst, $Ru/ZrO_2$ promoted with K, was also prepared using incipient wetness method. Specifically, a 0.5 wt % Ru-1.5% wtK/$ZrO_2$ catalyst was prepared. $ZrO_2$ (6568-45-11F3 ⅛' extrudate) was obtained from Engelhard, and ground and sieved into 70-100 mesh. Ru and K were co-impregnated onto the $ZrO_2$ support to its incipient wetness point (0.4 cc/g) from an aqueous solution of $RuCl_3$ hydrate (Aldrich, 99.98%) and $KNO_3$ (Aldrich, 99.99%). The impregnated sample was set at room temperature for 30 min prior to drying under vacuum at 100° C. overnight. Finally, the catalyst was calcined under ambient conditions with a ramping rate of 5 C/min to 350° C. and isothermally held at that temperature for 1 h. Again, the water gas shift reaction was carried out in a conventional fixed-bed down flow reactor. The reactor used for powder testing has an inside diameter of 5 mm. Typical catalyst loading was 0.06 gram of 70-100 mesh particles. FIG. 2 shows an example of results from reaction of a gas mixture consisting of 8% CO, 7% $CO_2$, 38% $H_2$, and 47% $H_2O$, over this powder catalyst, at a 25 millisecond (ms) contact time. Apparently, K greatly improved the $CO_2$ selectivity while still maintaining superior activity of $Ru/ZrO_2$ catalyst. For example, at a catalyst bed temperature of about 420° C., the conversion of CO reaches about 85% while the selectivity to carbon dioxide is greater than 90%.

Example 3

The powdered catalyst described in Example 2 was also investigated in various engineered forms. Experiments were conducted to demonstrate the present invention using 1 microchannel for the water gas shift reaction. The microchannel was placed within a tube furnace to provide the required preheat for the exothermic reaction. The microchannel was 5-cm long and 0.94-cm high. The width (or opening) of the microchannel was 0.0762-cm or 762-microns. In the case of felt-supported catalyst, 0.0222 g of powdered 0.5% Ru-1.5% K/ZrO2 catalyst described in Example 2 was coated on a metal felt of FeCrAl alloy obtained from Technetics, Deland, Fla. The dimensions of the felt are 1.27 cm in length, 0.94 cm in width, and 0.0254 cm in thickness. The porous structure contained a catalyst of 0.5% Ru-1.5% K/ZrO2 powdered catalyst that was prepared by 1) ball-milling the powdered catalyst 0.5% Ru-1.5% K/ZrO2 (using same method as described in Example 2) overnight; 2) slurry dip-coated on the FeCrAl felt until the desired loading is achieved; 3) the coated catalyst was dried at 90° C. overnight and calcined at 350° C. for four hours. Prior to the catalyst evaluation, catalyst was reduced in 10% $H_2/N_2$ (100 cc (STP)/min) at 110° C. for four hours. The felt-supported catalyst was placed inside the microchannel device as aforementioned.

Engineered foam-supported catalyst was prepared based on foam support monolith, which is typically 80-ppi (pores per inch) stainless steel (supplied by AstroMet), with characteristic macropores on the order of about 200-μm to 250-μm, and with a porosity of about 90% (by volume). The dimensions of the metal foam monolith are 1.50 cm×0.94 cm×0.0762 cm. The monolith pretreatment consists of cleaning successively in dichloromethane and acetone solvents in a water bath submersed in a sonication device to agitate the solvent within the monolith. Optionally, the metal surface of the monolith may then be roughened by etching with acid. If this is desired, the monolith is submerged in 0.1-molar nitric acid, and placed in a sonication device. The monolith is then rinsed in distilled water and dried at about 100° C. The foam-supported catalyst containing 0.0372 g of 0.5% Ru-1.5% K/ZrO2 catalyst (prepared using the same method as described in Example 2) was prepared by 1) ball-milling the powdered catalyst 0.5% Ru-1.5% K/ZrO2 (using same method as described in Example 2) overnight; 2) slurry dip-coated on the stainless steel foam metal until the desired loading is achieved; 3) the coated catalyst was dried at 90° C. overnight and calcined at 350° C. for four hours. Prior to the catalyst evaluation, catalyst was reduced in 10% $H_2/N_2$ (100 cc (STP)/min) at 110° C. for four hours. The foam-supported catalyst was snug-fitted inside the microchannel device as aforementioned. FIG. 3 shows an example of results from reaction of a gas mixture consisting of 8% CO, 7% $CO_2$, 38% $H_2$, and 47% $H_2O$, over these two types of engineered catalysts, at a 50 millisecond (ms) contact time. The felt catalyst outperformed the foam catalyst over the entire range of conditions studied as evidenced by higher CO conversions and $CO_2$ selectivities. For example, at a temperature of about 300° C. the felt catalyst gives higher than 85% CO conversion with near 100% $CO_2$ selectivity.

CLOSURE

While preferred embodiments of the present invention have been shown and described, it will be apparent to those skilled in the art that many changes and modifications may be made without departing from the invention in its broader aspects. The appended claims are therefore intended to include all such changes and modifications as fall within the true spirit and scope of the invention.

We claim:
1. A reactor comprising:
a reactor inlet, a reaction chamber, a reactor outlet, and a microchannel heat exchanger;
wherein the reaction chamber contains a zirconia-supported, alkali-metal-modified, ruthenium catalyst; and
wherein the microchannel heat exchanger is in thermal contact with the reaction chamber and wherein the catalyst is characterizable by a test in which the catalyst is placed in a reaction chamber having an insider diameter of 5 mm, in a fixed bed down flow reactor, and contacted with a reactant gas mixture containing 8% CO, 7% $CO_2$, 38% $H_2$, and 47% $H_2O$, at a contact time of 25 ms and a temperature of 420° C., resulting in greater than 70% CO conversion and at least 80% $CO_2$ selectivity.

2. The reactor of claim 1 wherein the reaction chamber has a width less than 2 mm.

3. The reactor of claim 2 wherein the heat exchanger is adjacent to the reaction chamber and wherein the heat exchanger has a width of less than 2 mm.

4. The reactor of claim 3 comprising at least two heat exchangers that are interleaved with at least 2 reaction chambers.

5. A fuel processing system comprising the reactor of claim 1.

6. A hydrogen production system comprising:
a fuel tank;
a primary conversion reactor capable of converting fuel to produce carbon monoxide;
wherein the primary conversion reactor comprises a fuel inlet, a primary conversion reactor chamber and an exhaust outlet;
a water gas shift reactor comprising a shift reactor inlet, a reaction chamber, and a shift reactor outlet;
wherein the shift reactor inlet is connected to the exhaust outlet; and
wherein the reaction chamber contains a zirconia-supported, alkali-metal-modified, ruthenium catalyst and wherein the catalyst is characterizable by a test in which the catalyst is placed in a reaction chamber having an insider diameter of 5 mm, in a fixed bed down flow reactor, and contacted with a reactant gas mixture containing 8% CO, 7% $CO_2$, 38% $H_2$, and 47% $H_2O$, at a contact time of 25 ms and a temperature of 420° C., resulting in greater than 70% CO conversion and at least 80% $CO_2$ selectivity.

7. The hydrogen production system of claim 6 further comprising a fuel cell to form a fuel processing system.

8. The hydrogen production system of claim 6 further comprising a microchannel heat exchanger in thermal contact with the reaction chamber.

9. The hydrogen production system of claim 6 wherein the reaction chamber has a width less than 2 mm.

10. The hydrogen production system of claim 8 comprising at least two microchannel heat exchangers that are interleaved with at least 2 reaction chambers.

11. The hydrogen production system of claim 6 comprising at least two microchannel heat exchangers that are interleaved with at least 2 reaction chambers, wherein the reaction chambers each have a width less than 2 mm.

* * * * *